United States Patent
Liu

(10) Patent No.: US 11,910,836 B2
(45) Date of Patent: Feb. 27, 2024

(54) ELECTRONIC CIGARETTE COMPRISING ONE-WAY VALVE

(71) Applicant: Shenzhen Eigate Technology Co., Ltd., Shenzhen (CN)

(72) Inventor: Tuanfang Liu, Shenzhen (CN)

(73) Assignee: ASPIRE NORTH AMERICA LLC

( * ) Notice: Subject to any disclaimer, the term of this patent is extended or adjusted under 35 U.S.C. 154(b) by 321 days.

(21) Appl. No.: 17/330,376

(22) Filed: May 25, 2021

(65) Prior Publication Data

US 2022/0175041 A1 Jun. 9, 2022

(30) Foreign Application Priority Data

Dec. 4, 2020 (CN) .......................... 202011403614.6
Dec. 4, 2020 (CN) .......................... 202022901912.X
Dec. 4, 2020 (CN) .......................... 202022903548.0

(51) Int. Cl.
*A24F 40/485* (2020.01)
*A24F 40/10* (2020.01)
*F16K 15/14* (2006.01)

(52) U.S. Cl.
CPC ............ *A24F 40/485* (2020.01); *A24F 40/10* (2020.01); *F16K 15/147* (2013.01)

(58) Field of Classification Search
CPC ......... A24F 40/485; A24F 40/10; A24F 40/40
See application file for complete search history.

(56) References Cited

U.S. PATENT DOCUMENTS

| 2016/0270446 A1* | 9/2016 | Shenkal | H05B 3/40 |
| 2018/0343925 A1* | 12/2018 | Wensley | F04B 19/00 |
| 2022/0117310 A1* | 4/2022 | Nelson | A24F 40/70 |
| 2022/0175025 A1* | 6/2022 | Liu | A24F 1/28 |

FOREIGN PATENT DOCUMENTS

| CN | 211746967 U * | 10/2020 | ............ A24F 40/10 |
| WO | WO-2016055653 A1 * | 4/2016 | ........... A24F 47/002 |

\* cited by examiner

*Primary Examiner* — Hae Moon Hyeon
(74) *Attorney, Agent, or Firm* — MATTHIAS SCHOLL P.C.; Matthias Scholl

(57) ABSTRACT

An electronic cigarette, including an air passage and a one-way valve disposed in the air passage. The one-way valve includes a soft material. When in use, a forward airflow is passable through the one-way valve, and a reverse airflow is unpassable through the one-way valve, thus preventing the reverse airflow or saliva from entering the atomizer of the electronic cigarette.

4 Claims, 6 Drawing Sheets

ELECTRONIC CIGARETTE COMPRISING ONE-WAY VALVE

CROSS-REFERENCE TO RELATED APPLICATIONS

Pursuant to 35 U.S.C. § 119 and the Paris Convention Treaty, this application claims foreign priority to Chinese Patent Application No. 202011403614.6 filed Dec. 4, 2020, to Chinese Patent Application No. 202022901912.X filed Dec. 4, 2020, and to Chinese Patent Application No. 202022903548.0 filed Dec. 4, 2020. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to an electronic cigarette comprising a one-way valve.

Conventionally, when a user blows the air into the air passage of an electronic cigarette, the air will enter the atomizer and squeeze out the e-liquid, thus staining the electronic cigarette.

SUMMARY

The disclosure provides an electronic cigarette, comprising an air passage and a one-way valve disposed in the air passage; the one-way valve comprises a soft material; when in use, a forward airflow is passable through the one-way valve, and a reverse airflow is unpassable through the one-way valve, thus preventing the reverse airflow or saliva from entering an atomizer of the electronic cigarette.

In a class of this embodiment, the one-way valve comprises an upper part and a lower part; the lower part is a hollow cylinder and a lower edge of the hollow cylinder comprises an inner protrusion along a radial direction of the hollow cylinder.

In a class of this embodiment, the upper part is an inverted V-shape and comprises a first end fixedly disposed on the lower part and a second end comprising a slot; the slot is configured to allow the forward airflow to pass through.

In a class of this embodiment, the one-way valve comprises environmentally friendly soft silicone material or soft latex material.

In a class of this embodiment, the forward airflow enters the hollow cylinder of the one-way valve and flows out from the slot. when an airflow enters the one-way valve from the upper part thereof, the slot is automatically closed, so that the airflow is unpassable through the one-way valve.

DETAILED DESCRIPTION

To further illustrate, embodiments detailing a one-way valve are described below. It should be noted that the following embodiments are intended to describe and not to limit the disclosure.

Figure 1:
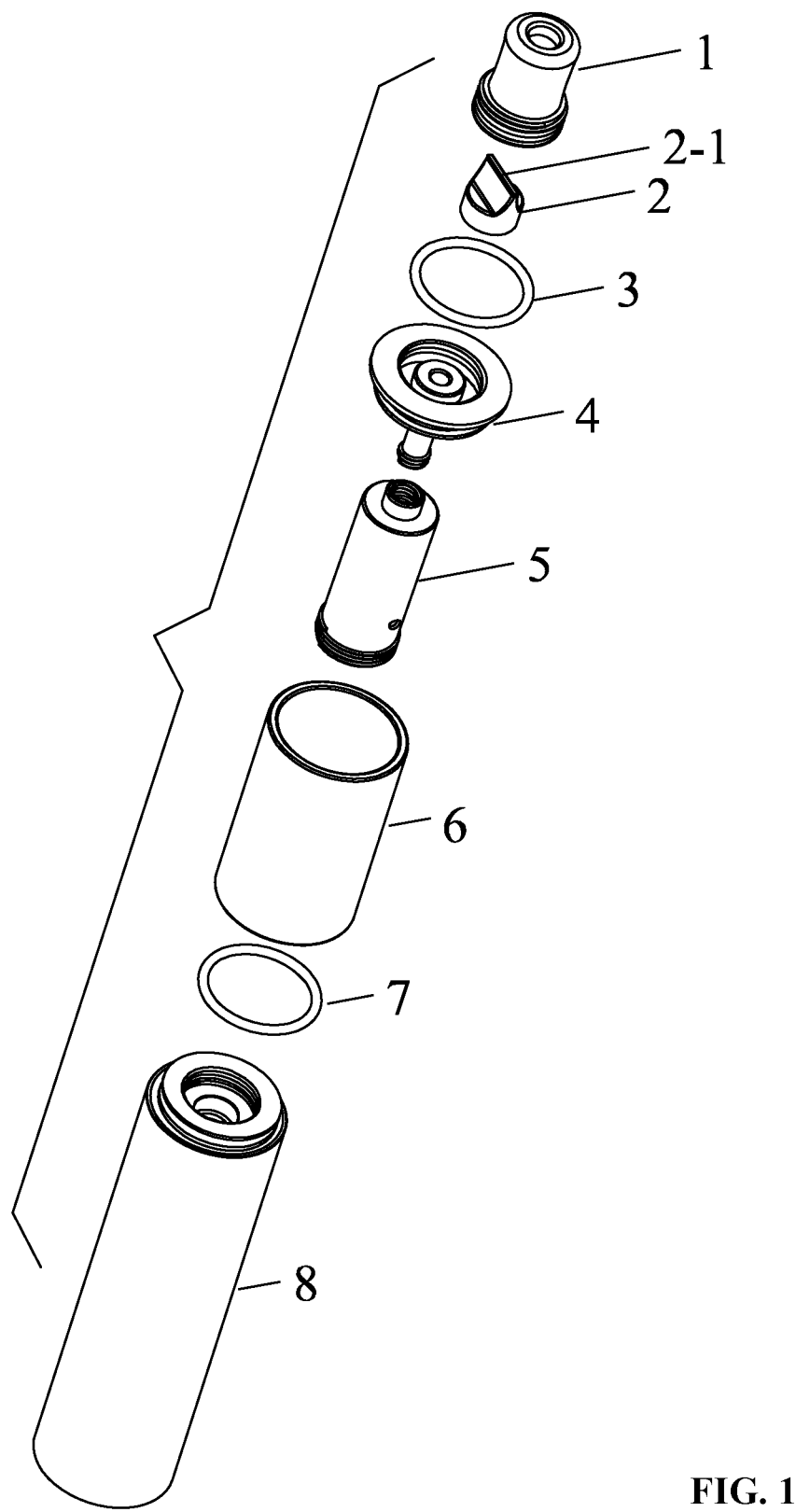
FIG. 1 is an exploded view of an electronic cigarette comprising a one-way valve according to one embodiment of the disclosure.
Figure 2:
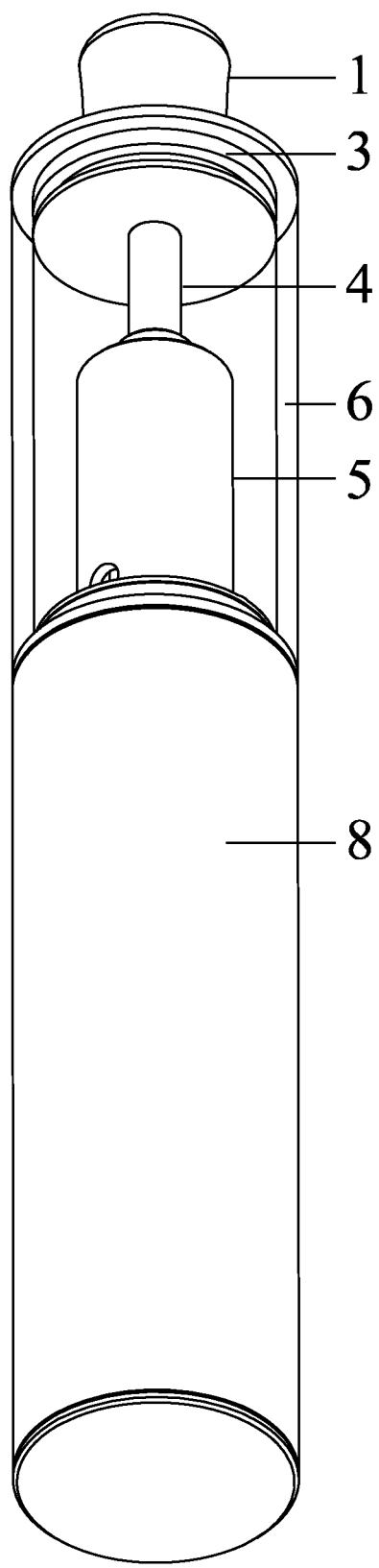
FIG. 2 is a schematic diagram of an electronic cigarette comprising a one-way valve according to one embodiment of the disclosure.
Figure 3:
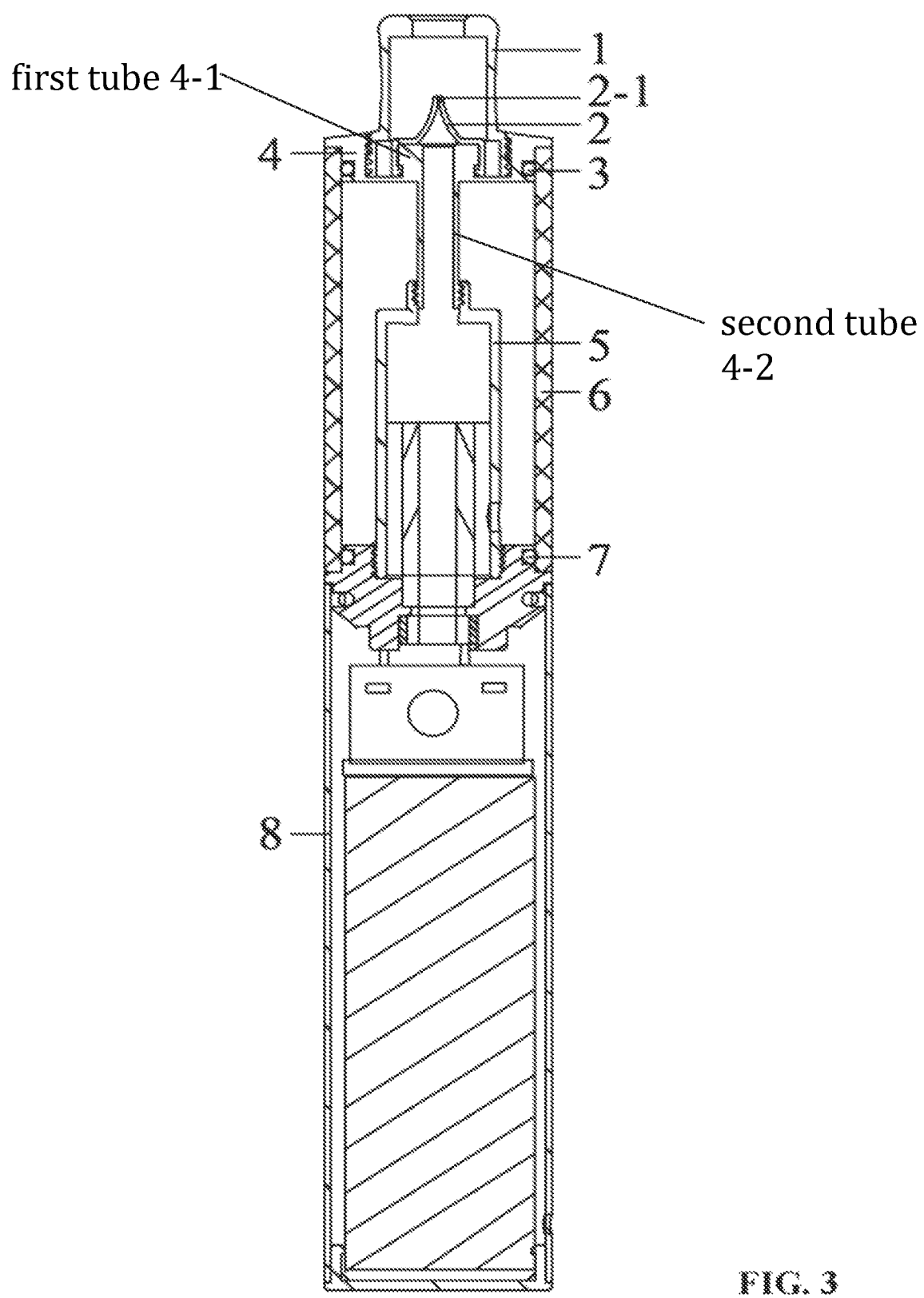
FIG. 3 is a sectional view of an electronic cigarette comprising a one-way valve according to one embodiment of the disclosure.
Figure 4A:
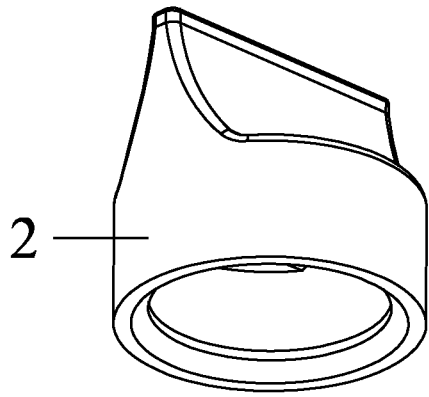
FIG. 4A is a schematic diagram of a one-way valve of an electronic cigarette according to one embodiment of the disclosure.
Figure 4B:
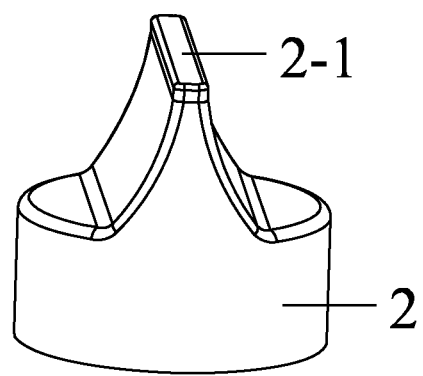
FIG. 4B is a schematic diagram of a one-way valve of an electronic cigarette in another angle of view according to one embodiment of the disclosure.
Figure 4C:
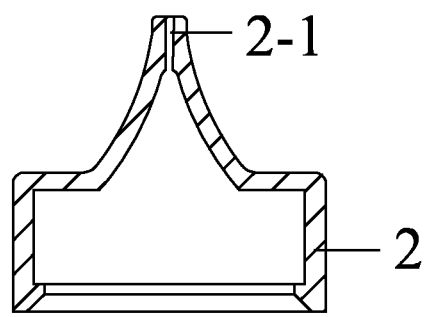
FIG. 4C is a sectional view of a one-way valve of an electronic cigarette according to one embodiment of the disclosure.
Figure 5A:
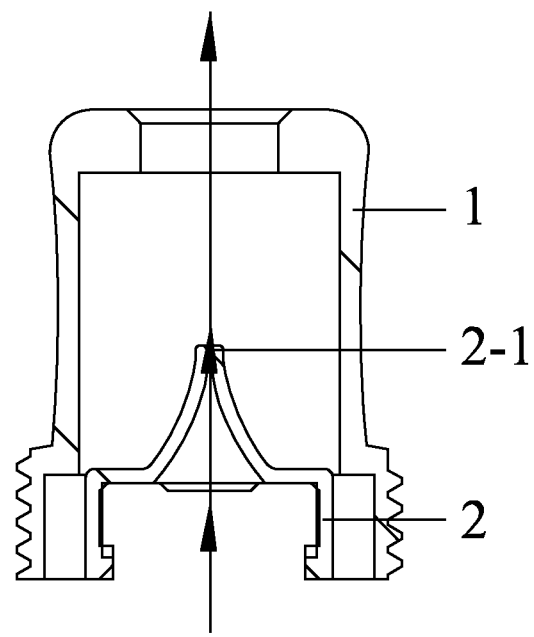
FIG. 5A shows a forward airflow of a one-way valve of an electronic cigarette according to one embodiment of the disclosure.
Figure 5B:
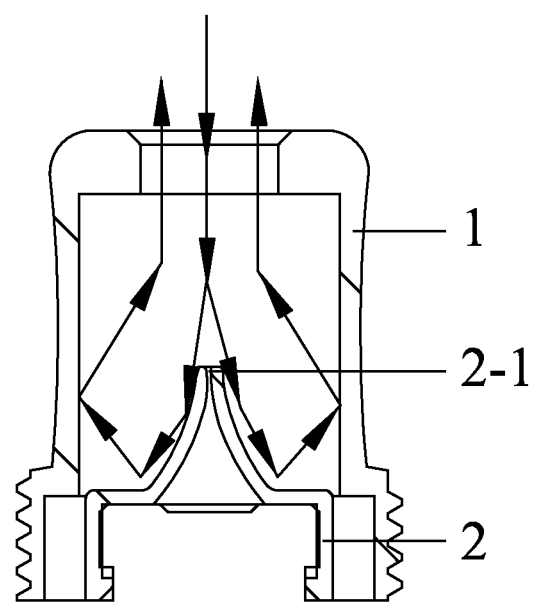
FIG. 5B shows a reverse airflow of a one-way valve of an electronic cigarette according to one embodiment of the disclosure.

As shown in FIGS. 1-5B, the disclosure provides an electronic cigarette comprising a mouthpiece 1, a one-way valve 2, a first seal ring 3, a base 4, an atomizing core 5, a glass tube 6, a second seal ring 7, and a battery 8. The top end of the battery comprises a screw thread. The atomizing core 5 is fixedly disposed on the top end of the battery through the screw thread. The glass tube 6 abuts against the top end of the battery. The atomizing core 5 is disposed in the glass tube 6. The glass tube 6 is configured to store e-liquid. The second seal ring 7 is disposed between the screw thread of the battery 8 and the bottom opening of the glass tube 6 to seal the bottom opening. The upper part of the base 4 is disposed in the top opening of the glass tube 6 and the lower part of the base 4 is in threaded connection to the top end of the atomizing core 5. As shown in FIG. 3, the base 4 comprises a first tube 4-1 disposed inside the one-way valve 2 and a second tube 4-2 extending into the atomizing core 5 and communicating with the first tube 4-1. The first seal ring 3 is disposed between the upper part of the base 4 and the top opening of the glass tube 6 to seal the top opening. The one-way valve 2 is disposed in the cavity of the mouthpiece 1 to prevent the reverse air from the mouthpiece 1 from entering the glass tube 6 to extrude the e-liquid and guide the reverse air out of the mouthpiece. The mouthpiece 1 is in threaded connection to the base 4.

Figure 6:
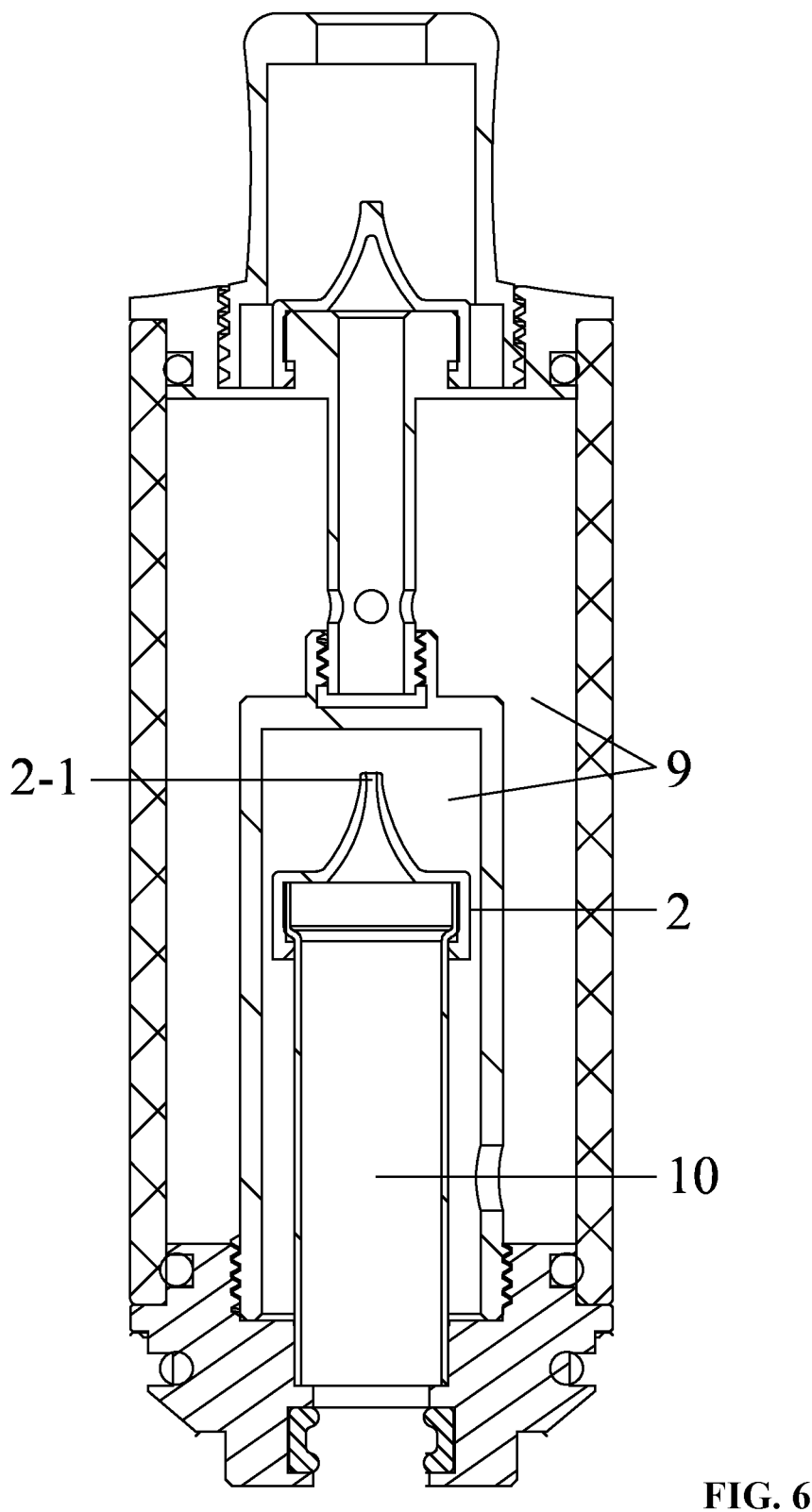
FIG. 6 is a use diagram of a one-way valve of an electronic cigarette according to one embodiment of the disclosure.

In certain embodiments, as shown in FIG. 6, the one-way valve is disposed in an electronic hookah. Specifically, the electronic hookah comprises an air passage 10 and a water channel 9. The one-way valve is disposed between the air passage and the water channel. The vapor passes through the air passage with the forward air flow, through the one-way valve 2, and then enters the water channel. When the one-way valve 2 is squeezed by water in the water channel, the slot 2-1 of the one-way valve 2 is closed automatically, so that the water cannot enter the air passage through the one-way valve 2.

The following advantages are associated with the electronic cigarette of the disclosure:

1. The electronic cigarette comprises a one-way valve, which can prevent the reverse airflow from entering the e-cigarette to squeeze out the e-liquid.

2. The one-way valve comprises environmentally friendly soft silicone material or soft latex material and a slot. The slot can automatically close when a reverse air pressure, oil pressure and water pressure is exerted on the upper part of the one-way valve, thus ensuring the reverse airflow is unpassable through the one-way valve.

It will be obvious to those skilled in the art that changes and modifications may be made, and therefore, the aim in the appended claims is to cover all such changes and modifications.

What is claimed is:

1. An electronic cigarette, comprising a mouthpiece, a base, an atomizing core, a glass tube, a battery, and a one-way valve; wherein the glass tube is disposed on the battery, and is configured to store e-liquid;

the atomizing core is disposed in the glass tube;

the one-way valve is disposed in a cavity of the mouthpiece;

the one-way valve comprises a silicone material or a latex material; when in use, a forward airflow is passable through the one-way valve, and a reverse airflow is unpassable through the one-way valve, thus preventing the reverse airflow or saliva from entering the atomizer core of the electronic cigarette;

the mouthpiece is disposed on and is in threaded connection to the base; and the base comprises a first tube and a second tube; the first tube is disposed inside the one-way valve; the second tube extends into the atomizing core; and an inner space of the first tube communicates with an inner space of the second tube.

2. The electronic cigarette of claim 1, wherein the one-way valve comprises a slot; the slot is configured to allow the forward airflow to pass through.

3. The electronic cigarette of claim 2, wherein the forward airflow enters the one-way valve and flows out from the slot when in use.

4. The electronic cigarette of claim 3, wherein when an airflow enters the one-way valve, the slot is automatically closed, so that the airflow is unpassable through the one-way valve.

* * * * *